(12) United States Patent
Lal et al.

(10) Patent No.: US 10,833,808 B1
(45) Date of Patent: Nov. 10, 2020

(54) MULTICAST ERROR DETECTION AND RECOVERY

(71) Applicant: Cisco Technology, Inc., San Jose, CA (US)

(72) Inventors: Roshan Lal, San Jose, CA (US); Rishi Chhibber, Dublin, CA (US); Mankamana Prasad Mishra, Dublin, CA (US); Peter Psenak, Bratislava (SK); Padmanab Pathikonda, Mountain House, CA (US); Francesco Meo, San Jose, CA (US); Anand Kumar Singh, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/428,203

(22) Filed: May 31, 2019

(51) Int. Cl.
*H04L 1/12* (2006.01)
*H04L 12/18* (2006.01)
*H04L 1/18* (2006.01)

(52) U.S. Cl.
CPC ............. *H04L 1/12* (2013.01); *H04L 1/1816* (2013.01); *H04L 12/18* (2013.01); *H04L 2001/125* (2013.01)

(58) Field of Classification Search
None
See application file for complete search history.

(56) References Cited

U.S. PATENT DOCUMENTS

| | | | | |
|---|---|---|---|---|
| 9,240,942 | B2* | 1/2016 | Cai | H04L 12/1886 |
| 2006/0094440 | A1* | 5/2006 | Meier | H04W 72/005 |
| | | | | 455/453 |
| 2006/0168317 | A1* | 7/2006 | Charzinski | H04L 45/22 |
| | | | | 709/238 |
| 2008/0212583 | A1* | 9/2008 | Rey | H04L 12/1836 |
| | | | | 370/390 |
| 2014/0219209 | A1* | 8/2014 | Soneda | H04L 45/025 |
| | | | | 370/329 |

* cited by examiner

*Primary Examiner* — Anh Ngoc M Nguyen
(74) *Attorney, Agent, or Firm* — Merchant & Gould P.C.

(57) ABSTRACT

Multicast error detection and recovery may be provided. A join request for a multicast stream may be sent from a first network node to a second network node. The join request may be sent over a first link of a plurality of links between the first network node and the second network node. A redirect message indicating that the second network node cannot accommodate the join request may be received by the first network node from the second network node. In response to receiving the redirect message, the join request for the multicast stream may not be sent on a second link of the plurality of links by the first network node to the second network node. And in response to receiving the redirect message, an alternate upstream network node may be determined by the first network node to send the join request for the multicast stream to.

17 Claims, 10 Drawing Sheets

MULTICAST ERROR DETECTION AND RECOVERY

TECHNICAL FIELD

The present disclosure relates generally to communication networks, and more particularly to a multicast stream.

BACKGROUND

Communication networks are used for transporting information from an information provider to one or more information consumers. One technique for transporting information from an information provider to a group of information consumers over the communication network may be multicasting. Multicasting may allow the information provider, also referred to as a multicast source or sender, to transmit the information as multicast packets simultaneously to one or more information consumers, also referred to as multicast clients or receivers. The multicast packets may be routed from the source to the sender through the communication network by a number of network nodes, also referred to as routers.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
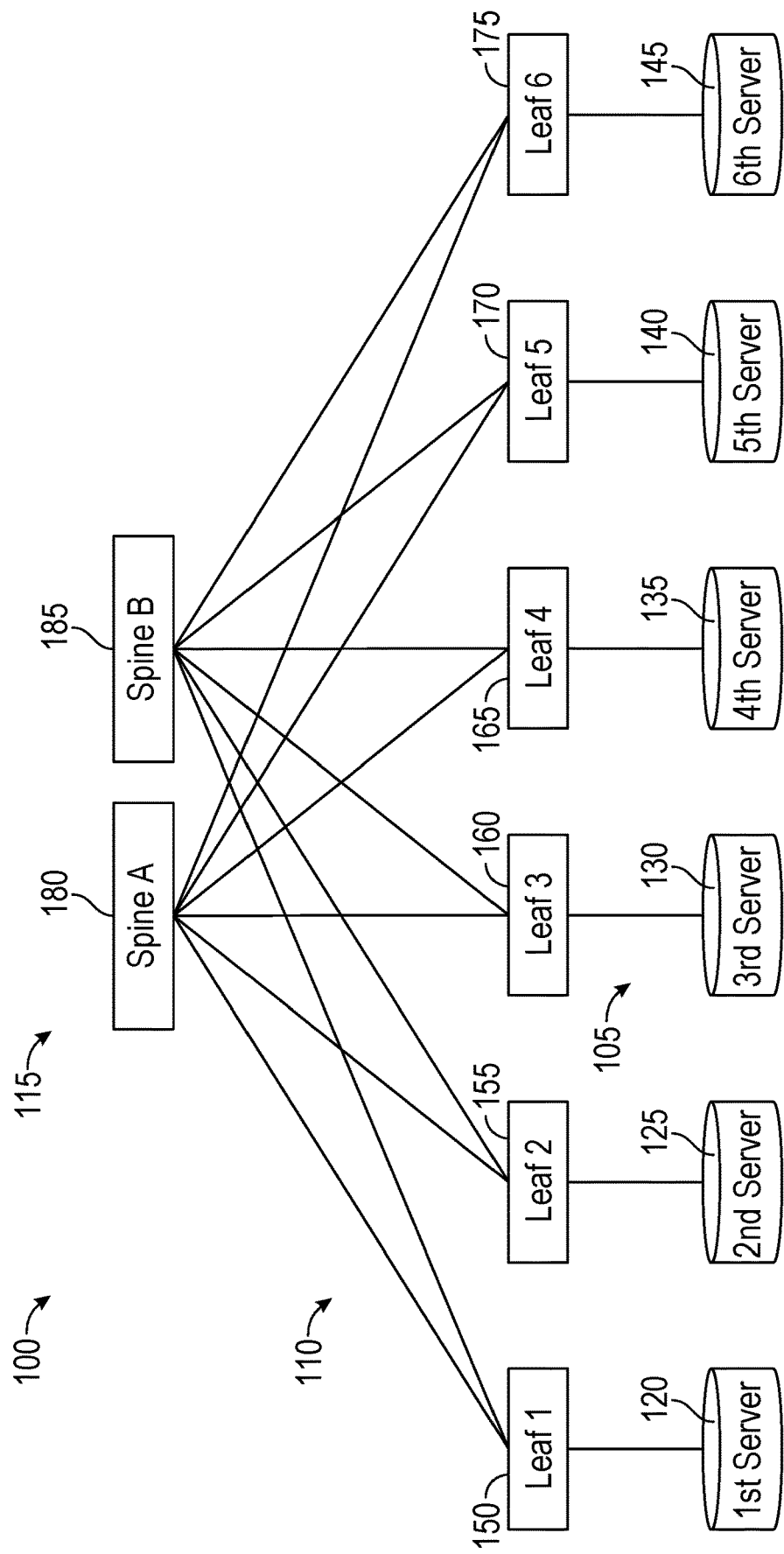
FIG. 1 is a block diagram of an operating environment.

Multicast error detection and recovery may be provided. A join request for a multicast stream may be sent from a first network node to a second network node. The join request may be sent over a first link of a plurality of links between the first network node and the second network node. A redirect message indicating that the second network node cannot accommodate the join request may be received by the first network node from the second network node. In response to receiving the redirect message, the join request for the multicast stream may not be sent on a second link of the plurality of links by the first network node to the second network node. And in response to receiving the redirect message, an alternate upstream network node may be determined by the first network node to send the join request for the multicast stream to.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

Embodiments of the present disclosure may provide processes for automatic multicast error detection and recovery. Multicasting may refer to a technique for transporting information from an information provider or a source to a group of information consumers over a communication network. Multicasting may allow the source to transmit a single unit of multicast information as a multicast packet simultaneously to one or more receivers by addressing the multicast packet to the receivers using a multicast address. The multicast packet may be routed through a plurality of routers, also referred to as nodes, to the receivers.

Nodes may utilize a specific multicast routing protocol to route the multicast packet from the source to the receivers. For example, nodes may utilize a multicast routing protocol to form a multicast distribution tree by which the multicast packet may be distributed. Protocol Independent Multicast (PIM) protocol is one such example. In PIM, nodes of the communication network may establish a multicast distribution tree. Upon receiving a request to join the multicast stream from a receiver, a boundary node or a leaf node, may create a PIM join request from the received join request and enable hop-by-hop propagation of the PIM join request towards the source. Upon receiving the join request, the source may enable the receiver to become part of a group of receivers authorized to receive the packets of the multicast stream.

FIG. 1 is a block diagram of an operating environment 100 in which example processes may be implemented. Operating environment 100 may comprise a plurality of servers 105, a plurality of leaf switches 110, and a plurality of spine routers 115. Plurality of servers 105 may comprise, but are not limited to, a first server 120, a second server 125, a third server 130, a fourth server 135, a fifth server 140, and a sixth server 145. Plurality of leaf switches 110 may comprise, but are not limited to, a leaf 1 150, a leaf 2 155, a leaf 3 160, a leaf 4 165, a leaf 5 170, and a leaf 6 175. Plurality of spine routers 115 may comprise, but are not limited to, a spine A 180 and a spine B 185. Operating environment 100 may comprise a data center.

Each of plurality of servers 105 may connect to a respective one of plurality of leaf switches 110. Each of plurality of leaf switches 110 may connect to each of plurality of spine routers 115. Plurality of spine routers 115 may provide redundant paths and connectivity in operating environment 100. For example, plurality of spine routers 115 may include a plurality of ports operative to receive data packets and forward the received data packets to destination addresses. The connections between plurality of leaf switches 110 and plurality of spine routers 115 may illustrate connectivity and may not comprise actual links. Although in FIG. 1, plurality of leaf switches 110 may be shown to be directly connected to plurality of spine routers 115, there may be one or more intermediate switches or routers located between them. In example embodiments, plurality of leaf switches 110 and plurality of spine routers 115 may also be referred to as network nodes or nodes.

Figure 2A:
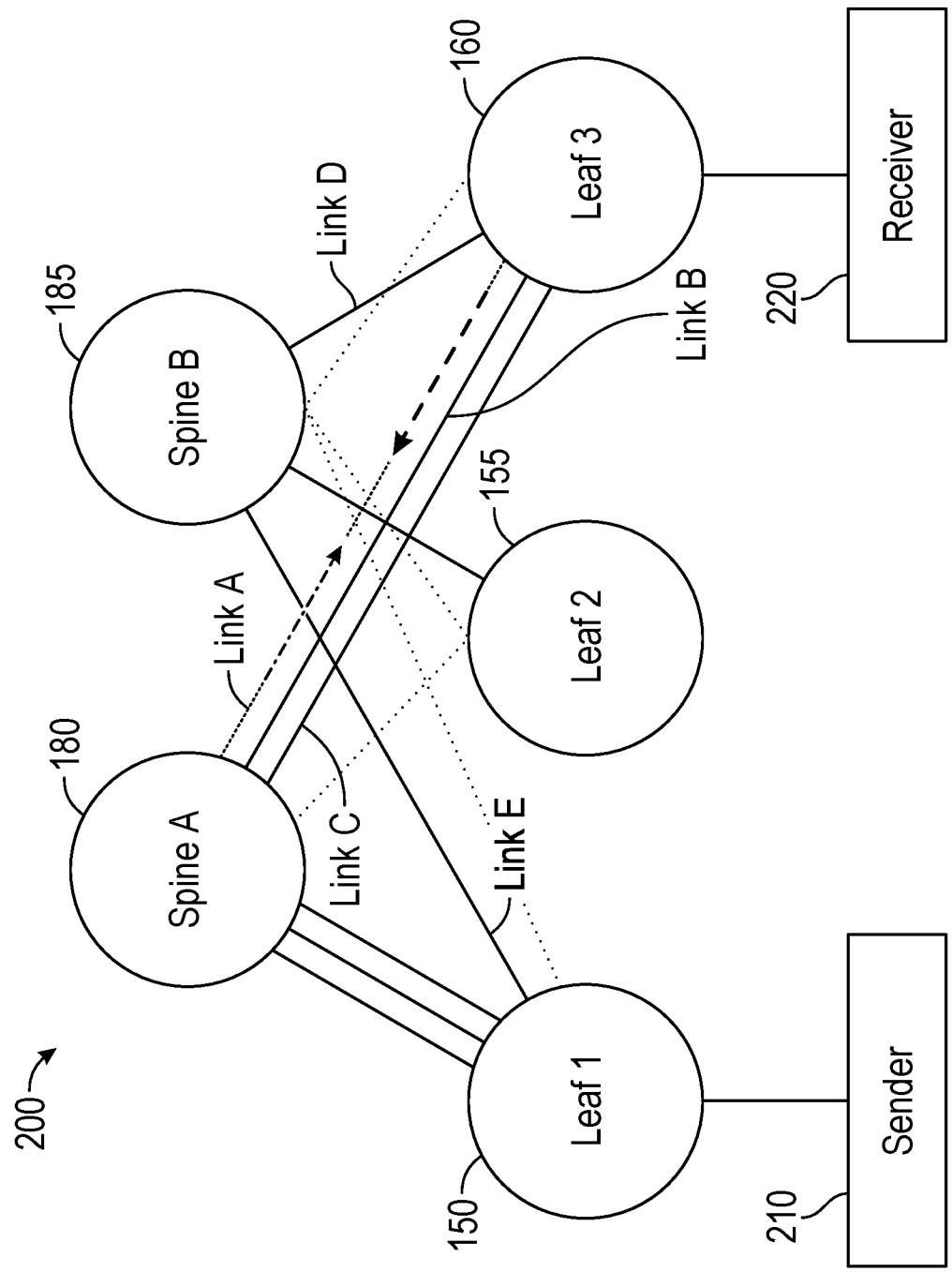
FIGS. 2A, 2B, 2C, and 2D illustrate flows of a join request for a multicast stream.

FIGS. 2A, 2B, 2C, and 2D illustrate flows of an example join request for a multicast stream in a multicast tree 200. In example embodiments, multicast tree 200 is formed in operating environment 100 of FIG. 1. As shown in FIG. 2A, multicast tree 200 may include a sender 210 and a receiver 220. Sender 210 may be a source of multicast packets for a multicast stream. In example embodiments, sender 210 may be one of first server 120, second server 125, third server 130, fourth server 135, fifth server 140, and sixth server 145. Similarly, receiver 220 may be one of first server 120, second server 125, third server 130, fourth server 135, fifth server 140, and sixth server 145.

Multicast tree 200 may further include plurality of spine routers 115, for example, spine A 180 and spine B 185. In addition, example multicast tree 200 may include some of plurality of leaf switches 110, for example, leaf 1 150, leaf 2 155, and leaf 3 160. Sender 210 may be connected to leaf 1 150 and receiver 220 may be connected to leaf 3 160. Each node (e.g., spines and leafs) of multicast tree 200 may be connected to other nodes via one more links.

Receiver 220 may initiate a join request to join the multicast stream. For example, receiver 220 may send the join request to a boundary node of multicast tree 200. For example, receiver 220 may send the join request to leaf 3 160. Leaf 3 160 may receive the join request and determine a next hop for the join request. The next hop may be an upstream node of multicast tree 200. For example, leaf 3 160 may determine spine A 180 as the next hop for the join request. A node discovered while traversing towards sender 210 in multicast tree 200 from a current node may be referred to as an upstream node. A node discovered while traversing towards receiver 220 from a current node in multicast tree 200 may be referred to as a downstream node. In example embodiments, the upstream node may be determined using an Equal Cost Multipath (ECMP) routing process or an Unequal Cost Multipath (UCMP) routing process.

Upon determining spine A 180 to be the next hop, leaf 3 160 may propagate the join request to spine A 180. As illustrated in FIG. 2A, leaf 3 160 may be connected to spine A 180 through a plurality of links, such as, link A, link B, and link C. Leaf 3 160 may forward the join request on one of the plurality of links, for example, link A. Spine A 180, after receiving the join request from leaf 3 160, may determine whether it is able to accommodate the join request. Spine A 180 may not be able to accommodate the join request when spine A is: i) isolated from participating in multicasting tree 200; ii) isolated from the multicasts stream associated with the join request; iii) lacking sufficient bandwidth to provide the multicast stream; iv) is going down; or v) software or hardware programming failure, for example, hardware table being exhausted. Isolation may be an administrator initiated isolation from any multicast stream or specifically the multicast stream associated with the join request.

Figure 2B:
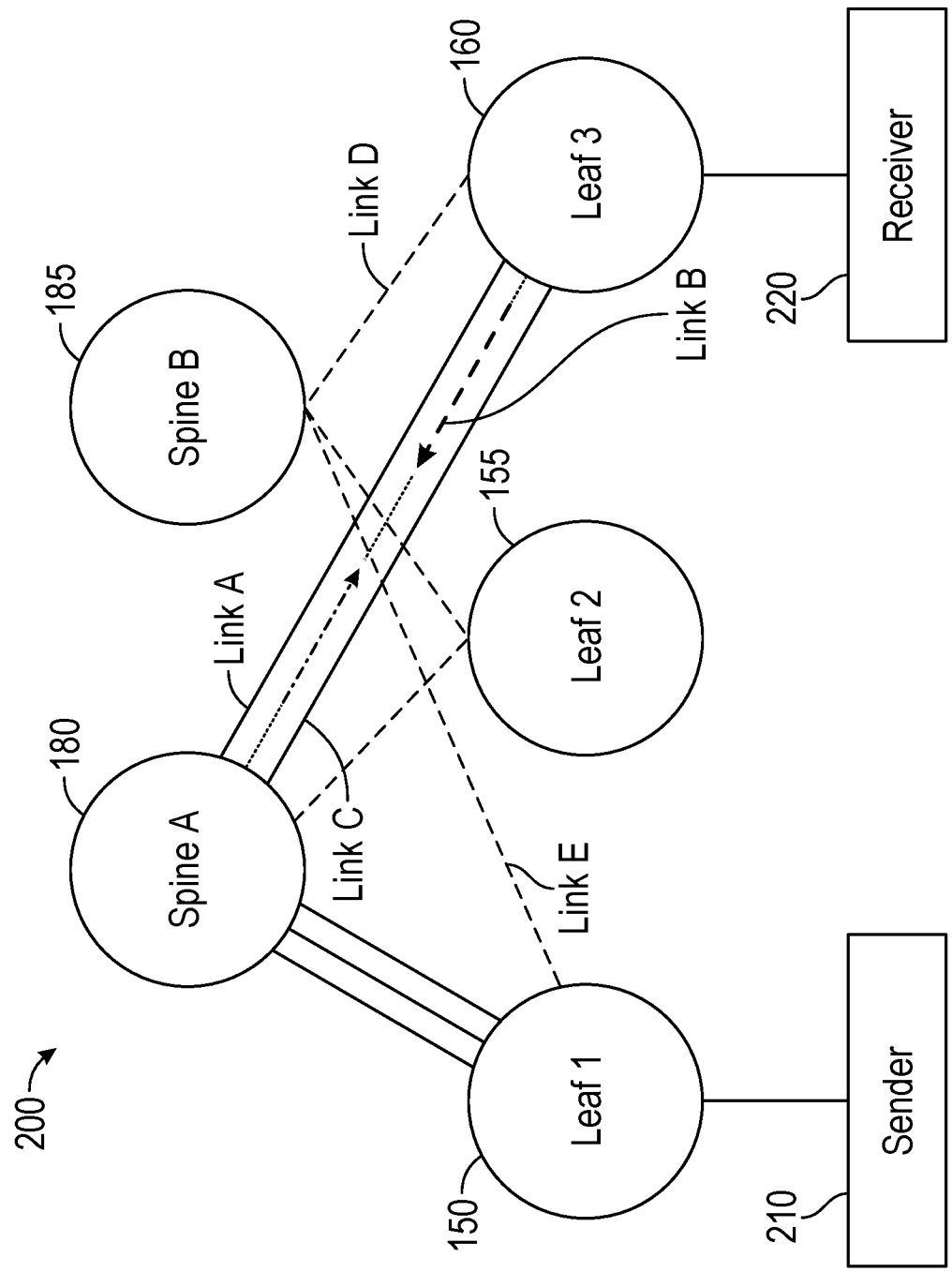

Upon determining that spine A 180 is unable to accommodate the join request, spine A 180 may send a redirect message to leaf 3 160. In conventional processes, upon receiving the redirect message on link A, leaf 3 160 may resend the join request to spine A 180 over other links, such as link B or link C. For example, and as illustrated in FIG. 2B, upon receiving the redirect message on link A, leaf 3 160 may resend the join request to spine A 180 over link B. Because spine A 180 is unable to accommodate the join request, spine A 180 may again send a redirect message in response to receiving the join request over link B.

Figure 2C:
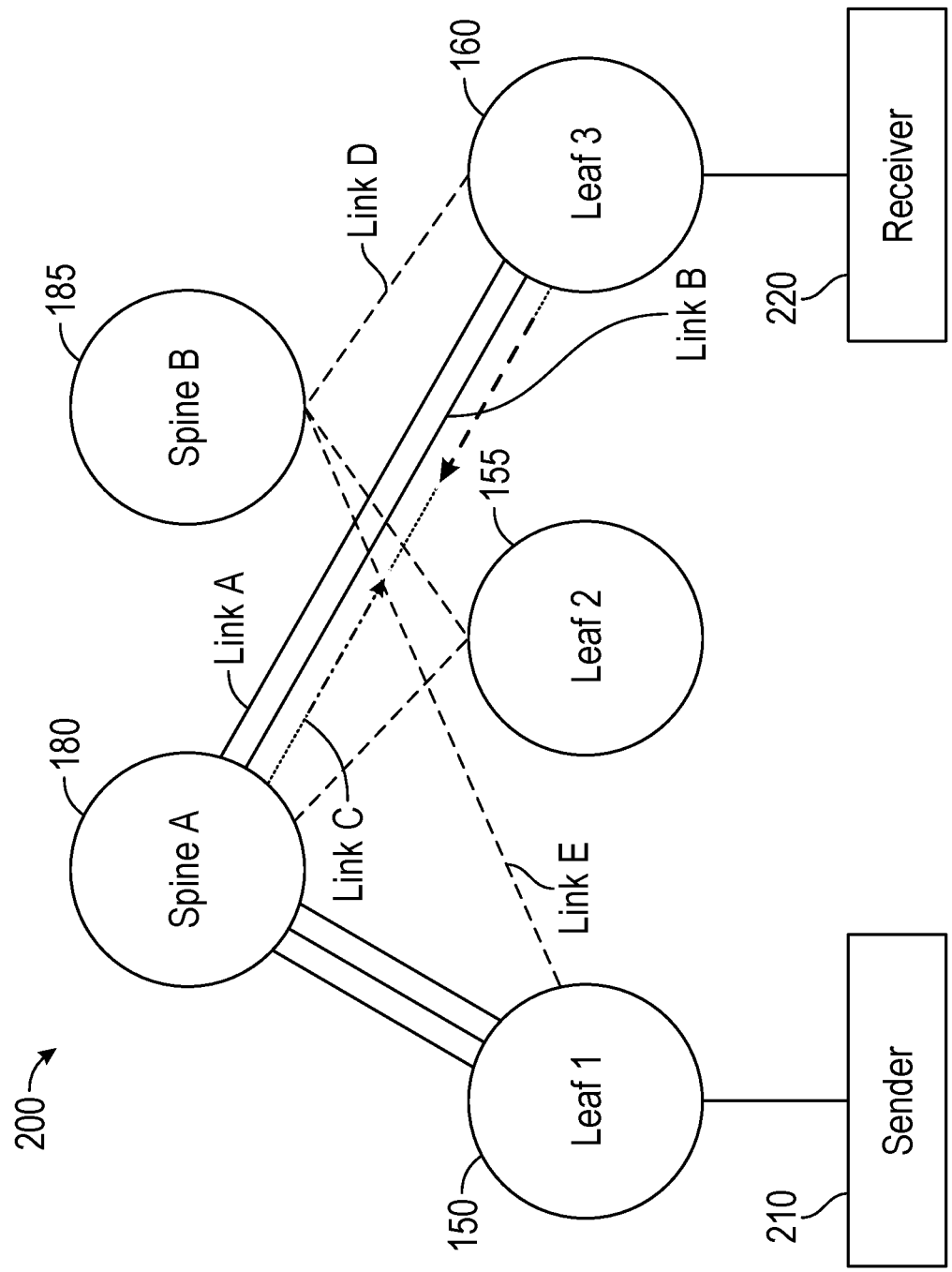

As shown in FIG. 2C, upon receiving the redirect message on link B, in conventional processes, leaf 3 160 then may resend the join request to spine A 180 over another link, such as, link C, the last link. Spine A 180, because of its inability to accommodate the join request for the multicast data traffic, may again send a redirect message in response to the resent join request over link C. In conventional processes, leaf 3 160 may repeatedly send the join request over each of the plurality of links (i.e., link A, link B, and link C) to an upstream node in spite of receiving a redirect message in response. Thus, in conventional processes, leaf 3 160 may only move to a next spine, that is spine B 185, after exhausting all possible paths to the initially selected spine, that is, spine A 180. Therefore, using the conventional process may lead to a delay in joining of the multicast stream and lower overall performance.

According to embodiments of the present disclosure, processes disclosed herein, upon receiving a redirect message over a first link in response to a join request from an upstream node, may not resend the join request to the same upstream node on alternative links. Instead, embodiments of the disclosure may determine an alternate upstream node and send the join request to the alternate upstream node. The alternate upstream node for the multicast data traffic may be determined using the ECMP or UCMP routing processes. Accordingly, embodiments of the disclosure may avoid delay and resource waste in joining a multicast stream.

Figure 2D:
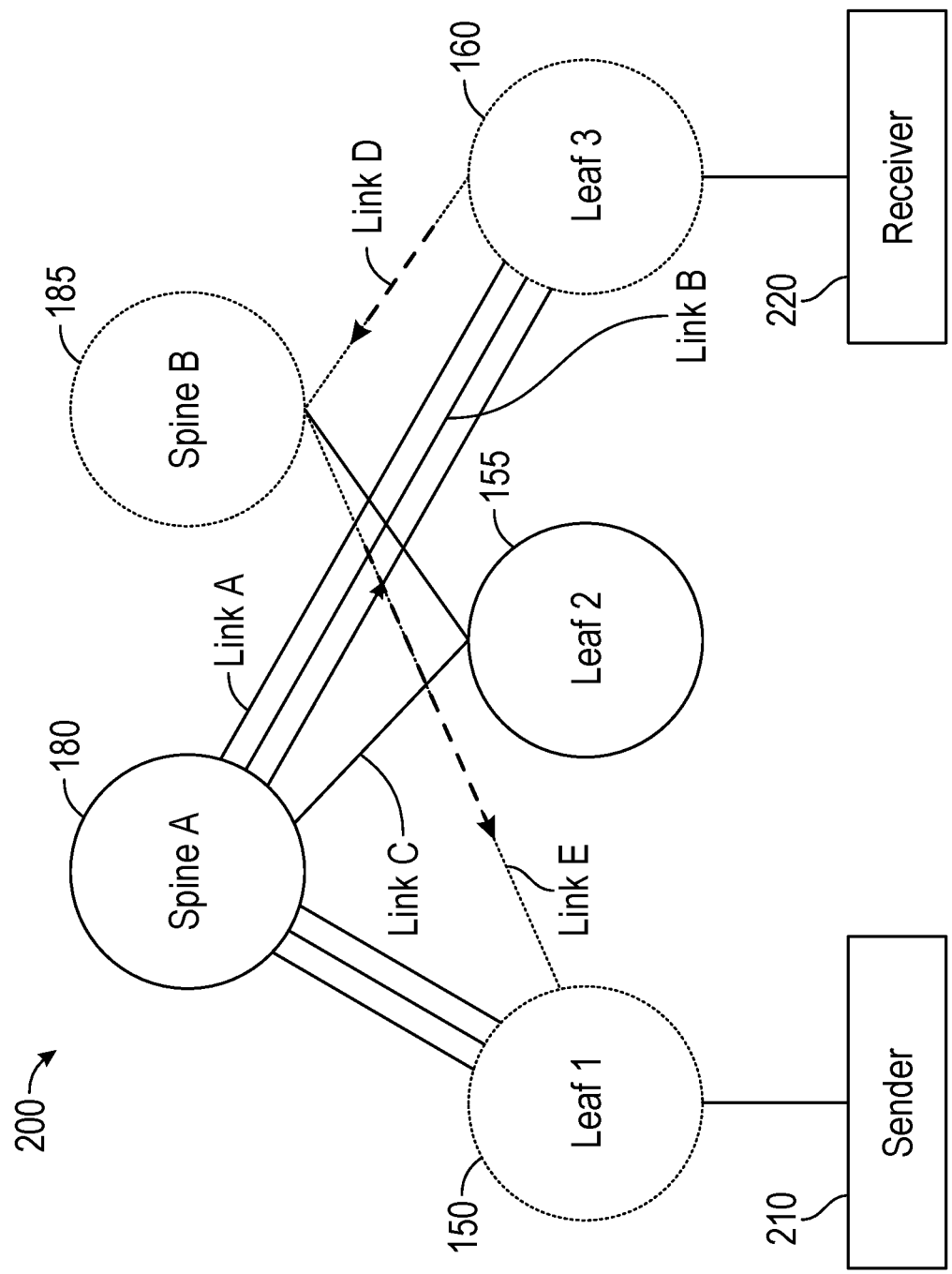

For example, and as shown in FIG. 2D, leaf 3 160, in response to receiving a redirect message (e.g., a first redirect message) from spine A 180, may determine an alternate upstream node, for example, spine B 185 for the multicast data traffic. Upon determining the alternate upstream node (e.g., spine B 185), leaf 3 160 may send a join request to spine B 185 on link D. Spine B 185, upon receiving the join request from leaf 3 160, may determine that spine B 185 is able to accommodate the join request. In response to determining that spine B 185 is able to accommodate the join request, spine B 185 may determine a next upstream node for the for the join request. Spine B 185 may determine the next upstream node for the join request using the ECMP or UCMP techniques.

Continuing with FIG. 2D, the next upstream node for spine B 185 may be leaf 1 150. Spine B 185 then may send the join request to leaf 1 150 on link E. Leaf 1 150, upon receiving the join request may determine whether it is able to accommodate the join request. In response to determining that leaf 1 150 is able to accommodate the join request, leaf 1 150 may determine a next upstream node for the join request. As shown in FIG. 2D the next upstream node from leaf 1 150 may be sender 210. Hence, leaf 1 150 may forward the join request to sender 210. After receiving the join request, sender 210 may provide the multicast stream to receiver 220. In example embodiments, receiver 220 may receive the multicast stream over a data path traversed by the join request.

Figure 3:
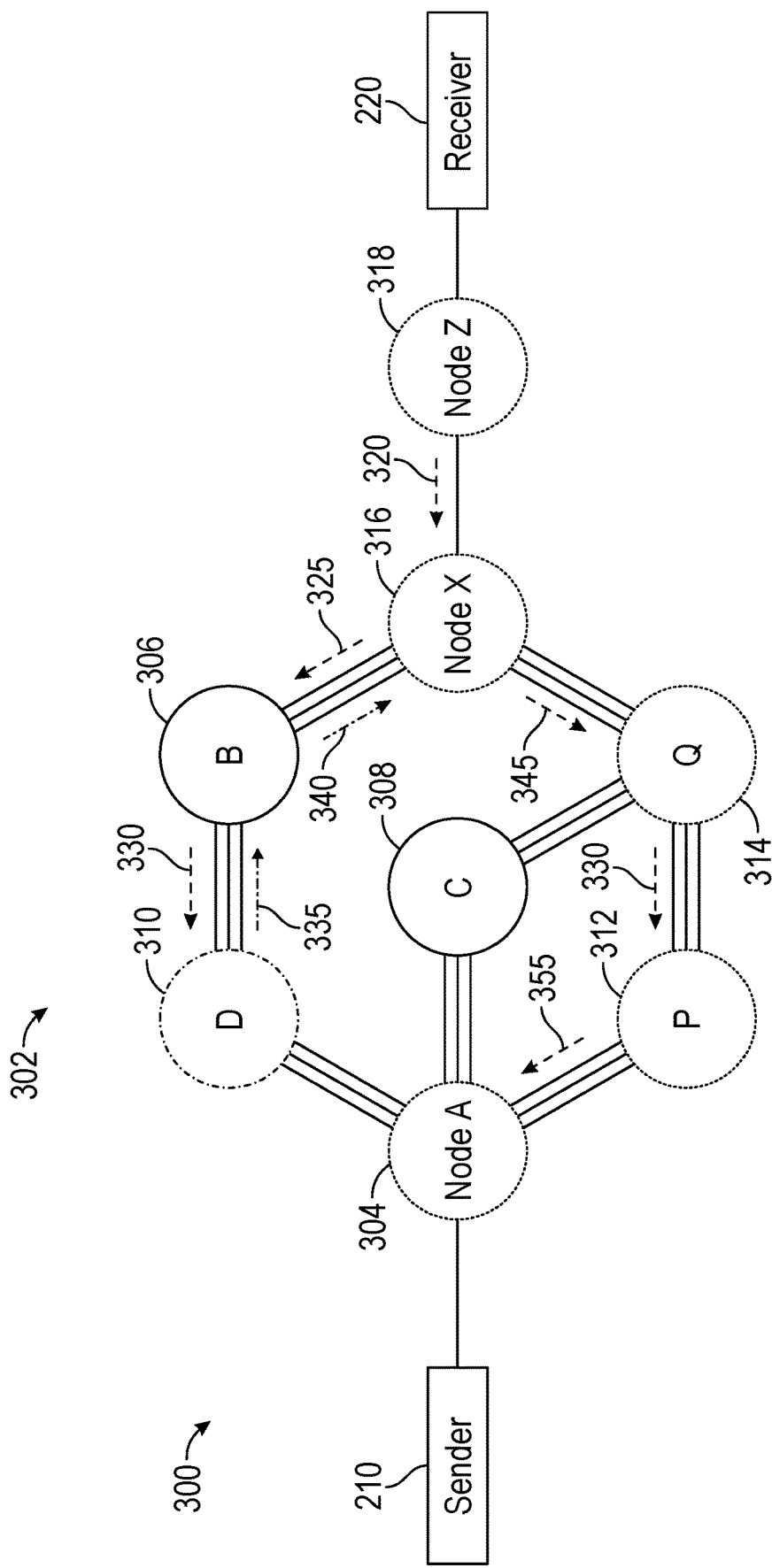
FIG. 3 illustrates multicast error detection and recovery in a multicast tree.

FIG. 3 illustrates data paths for a join request to join a multicast stream in a multicast tree 300. As shown in FIG. 3, multicast tree 300 may include sender 210 and receiver 220. Multicast tree 300 may be rooted at sender 210. Multicast tree 300 may further include a plurality of nodes 302, for example, node A 304, node B 306, node C 308, node D 310, node P 312, node Q 314, node X 316, and node Z 318. Node A 304 and Node Z 318 may also be referred to as boundary nodes or edge nodes of multicast tree 300. In addition, node Z 318 may be referred to as a Last Hop Router (LHR) and node A 304 may be referred to as a First Hop Router (FHR). Sender 210 may be connected to node A 304 and receiver 220 may be connected to node Z 318. Plurality of nodes 302 may be connected to each other over a plurality of links. Sender 210 may provide the multicast stream. Receiver 220 may attempt to join the multicast stream by initiating a join request.

The elements described above of multicast tree 300 may be practiced in hardware and/or in software (including firmware, resident software, micro-code, etc.) or in any other circuits or systems. The elements of multicast tree 300 may be practiced in electrical circuits comprising discrete electronic elements, packaged or integrated electronic chips containing logic gates, a circuit utilizing a microprocessor, or on a single chip containing electronic elements or microprocessors. Furthermore, the elements of multicast tree 300 may also be practiced using other technologies capable of performing logical operations such as, for example, AND, OR, and NOT, including but not limited to, mechanical, optical, fluidic, and quantum technologies. As described in greater detail below with respect to FIG. 7, the elements of multicast tree 300 may be practiced in a computing device 700.

Figure 4:
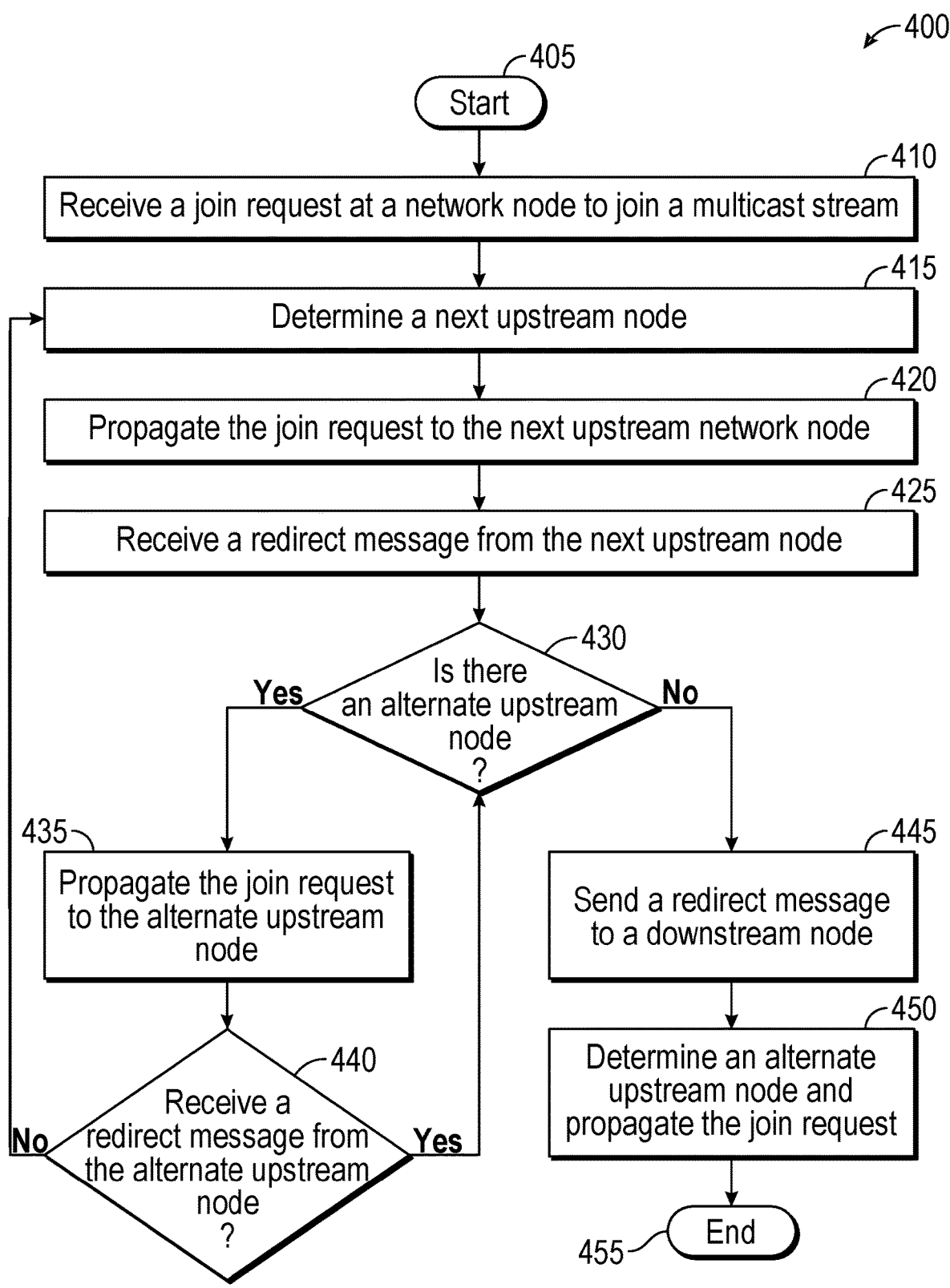
FIG. 4 is a flow diagram illustrating a method for multicast error detection and recovery in the multicast tree.

FIG. 4 illustrates a flow diagram of a method 400 for multicast error detection and recovery. Method 400 may be implemented using multicast tree 300 as described in more detail above with respect to FIG. 3. For example, method 400 may determine a data path for receiver 220 to join a multicast stream provided by sender 210. Method 400 may determine upstream nodes for a join request originating from receiver 220 until the join request eventually reaches sender 210 of the multicast stream. Thus, method 400 may determine a data path from receiver 220 to sender 210 in efficient manner.

Method 400 may begin at start block 405, and proceed to block 410 where a join request to join a multicast stream may be received. For example, receiver 220 may create a join request to join the multicast stream being provided by sender 210. The join request may include a source address S of a particular source, for example, sender 210, that provides the content that receiver 220 wishes to receive. In addition, the join request may include a group address G of a multicast group that receiver 220 may wish to join. Hence, the source address and multicast group address of the join request may be expressed as the tuple (S, G), which may uniquely identify the multicast stream provided by sender 210 to a multicast group address that receiver 220 may wish to receive. Receiver 220 may then send the join request to a next hop router, for example, a boundary node communicatively coupled to receive 220. For example, receiver 220 may send the join request to node Z 318. Node Z 318 may receive the join request.

After receiving the join request at block 410, method 400 may advance to block 415 where a next upstream node may be determined. For example, after receiving the join request from receiver 220, node Z 318 may process the join request and may determine a next upstream node. As shown in FIG. 3, node X 316 may be the next upstream node from node Z 318. Once having determined the next upstream node for the join request at block 415, method 400 may advance to block 420 where the join request may be propagated to the next upstream node. For example, node Z 318 may propagate the join request to node X 316.

In example embodiments, the join request may be propagated to a next upstream towards sender 210 until a redirect message is received. For example, each node, upon receiving the join request, may determine whether that node may be able to accommodate the join request. In response to determining that the node may be able to accommodate the join request, that node may determine a next upstream node and may propagate the join request to the determined next upstream node. The next upstream node may also be referred to as a next hop for the join request. However, upon determining that the node may not be able to accommodate the join request, that node may send a redirect message to a sending node indicating the sending node to determine an alternate next upstream node.

For example, node X 316 may receive the join request from node Z 318 (arrow 320) and may determine whether node X 316 may be able to accommodate the join request. Node X 316, upon determining that it may be able to accommodate the join request, may determine a next upstream node. As shown in FIG. 3, node X 316 may be connected to two upstream nodes, for example, node B 306 and node Q 314. Node X 316 may choose one of node B 306 and node Q 314 as the next upstream node. Node X may determine the next upstream node using the ECMP or UCMP techniques. For example, node X 316 may determine node B 306 to be the next upstream node and propagate the join request to node B 306 (arrow 325). Node B 306 may receive the join request from node X 316 and determine whether it may be able to accommodate the join request. Upon determining that that it may be able to accommodate the join request, node B 306 may determine a next upstream node for the join request. As shown in FIG. 3, node D 310 may be the next upstream node. Upon determining node D 310 to be the next upstream node, node B 306 may propagate the join request to node D 310 (arrow 330). The process of propagating the join request to the next upstream node may be repeated until a redirect message is received from the next node. Hence, in example embodiments, block 420 of method 400 may be repeated multiple time.

After propagating the join request to the next upstream node at block 420, method 400 may advance to block 425 where a redirect message may be received. In example embodiments, a redirect message may be received in response to a node being unable to accommodate the join request. For example, node D 310 may receive the join request from node B 306 and determine that node D 310 may not be able to accommodate the join request. Upon determining that it may not be able to accommodate the join request, node D 310 may send a redirect message (arrow 335) to the node from which the join request was received, for example, node B 306. An example redirect message is described below with respect to FIG. 6.

Once having received a redirect message at block 425, method 400 may advance to block 430 where an alternate upstream node may be determined. For example, upon receiving the redirect message from node D 310, node B 306 may determine whether there may be an alternate upstream node for the join request. For example, upon receiving the redirect message from node D 310, node B 306 may attempt to determine an alternate upstream node for the join request. Consistent with embodiments of the disclosure, upon receiving the redirect message from the upstream node, the join request may not be sent to the same upstream node over a different channel or link. Rather an alternate upstream node may be determined.

In response to determining that this is an alternate upstream node at block 430, method 400 may proceed to block 435 where the join request may be propagated to the alternate upstream node. After propagating the join request to the alternate upstream node at block 435, method 400 may advance to block 440 where a redirect message may be received from the alternate upstream node. For example, the alternate upstream node may determine that it may not be able to accommodate the join request, and hence may send a redirect message. However, when the alternate upstream node may determine that it may be able to accommodate the join request, a redirect message may not be received from the alternate upstream node. In response to not receiving a redirect message from the alternate upstream node, method 400 may loop back to block 415 where a next upstream node may be determined. That is, in response to the alternate upstream node determining that it may be able to accommodate the join request, method 400 may loop back to block 415 where the alternate node may determine a next upstream node for the join request.

However, if a redirect message is received from the alternate upstream node at block 440, method 400 may loop back to block 430. In example embodiments, blocks 435 and 440 may be repeated multiple times until no alternate upstream nodes are available. Looping back to block 430, if there are no alternate upstream nodes, method 400 may proceed to block 445 where a redirect message may be sent to a downstream node. In example embodiments, a node upon being unable to find an upstream node for the join request may send a redirect message to the downstream node from which the join request was received. For example, in FIG. 3, in response to receiving a redirect message from node D 310, node B 306 may attempt to determine an alternate upstream node for the join request. However, and as illustrated in FIG. 3, there may not be alternate upstream node associated with node B 306. Hence, node B 306 may send a redirect message (arrow 340) to the downstream node, that is, node X 316 from which the join request may have been received.

Upon receiving the redirect message from the upstream node at block 445, method 400 may advance to block 450 where the downstream node may attempt to determine an alternate upstream node and propagate the join request to an available alternate node. For example, and as shown in FIG. 3, in response to receiving the redirect message from node B 306, node X 316 may determine an alternate upstream node for the join request. Node X 316 may determine the alternate upstream node for the join request using the ECMP or UCMP techniques.

In example embodiments, when there are no alternate upstream nodes from the downstream node, the redirect message may be sent to a next downstream node which may attempt to determine alternate upstream nodes. If no alternate upstream nodes are determined from a boundary node with which receiver 220 may be coupled, the boundary node may send a failure to join message to receiver 220. Moreover, if no alternate upstream nodes are determined from the boundary node, the boundary node may generate a warning message for an administrator. The warning message may include an error code for the administrator to resolve the failure to join.

Continuing with FIG. 3, an alternate upstream node for the join request from node X 316 may be node Q 314. Thus, node X 316 may propagate the join request to node Q 314 (arrow 345). Node Q 314, upon receiving the join request may determine whether node Q 314 may be able to accommodate the join request. Upon determining that it may be able to accommodate the join request, node Q 314 may determine a next upstream node for the join request. For example, and as shown in FIG. 3, node Q 314 may be associated with two upstream nodes, node C 308 and node P 312. Node Q 314 may determine one of node C 308 and node P 312 as the next upstream node using the ECMP or UCMP techniques. For example, and as shown in FIG. 3 node Q 314 may determine node P 312 to be the next upstream node for the join request.

After determining node P 312 as the next upstream node, node Q 314 may send the join request (arrow 350) to node P 312. Node P 312, upon receiving the join request from node Q 314 may determine that it is able to accommodate the join request for the multicast stream. Once having determined that node P 312 is able to accommodate the join request, node P 312 may determine a next upstream node for the join request. As shown in FIG. 3, the next upstream node for the join request from node P 312 may be node A 304.

After determining node A 304 as the next upstream node, node P 312 may send the join request to node A 304 (arrow 355). Node A 304, upon receiving the join request, may determine that it may be able to accommodate the join request for the multicast stream. Once having determined that it may be able to accommodate the join request, node A 304 may determine a next upstream node for the join request. For example, and as shown in FIG. 3, node A 304 may be a boundary node and associated with sender 210. Hence, node A 304 may determine sender 210 as the next upstream node. After determining sender 210 to be the next upstream node, node A 304 may send the join request to sender 210. In example embodiments, the process of determining an alternate or next upstream node and propagating the join request to the alternate or next upstream node may be repeated until the join request may reach sender 210 or a failure to join message may be received by receiver 220.

In example embodiment, sender 210, upon receiving the join request from node A 304 may admit receiver 220 in a multicast group to receive the multicast stream. Moreover, sender 210 may determine a data path for the multicast stream for receiver 220. Receiver 220 may then join the multicast stream and start receiving data packets of the multicast stream over the determined data path. Method 400 may then terminate at end block 450.

Figure 5:
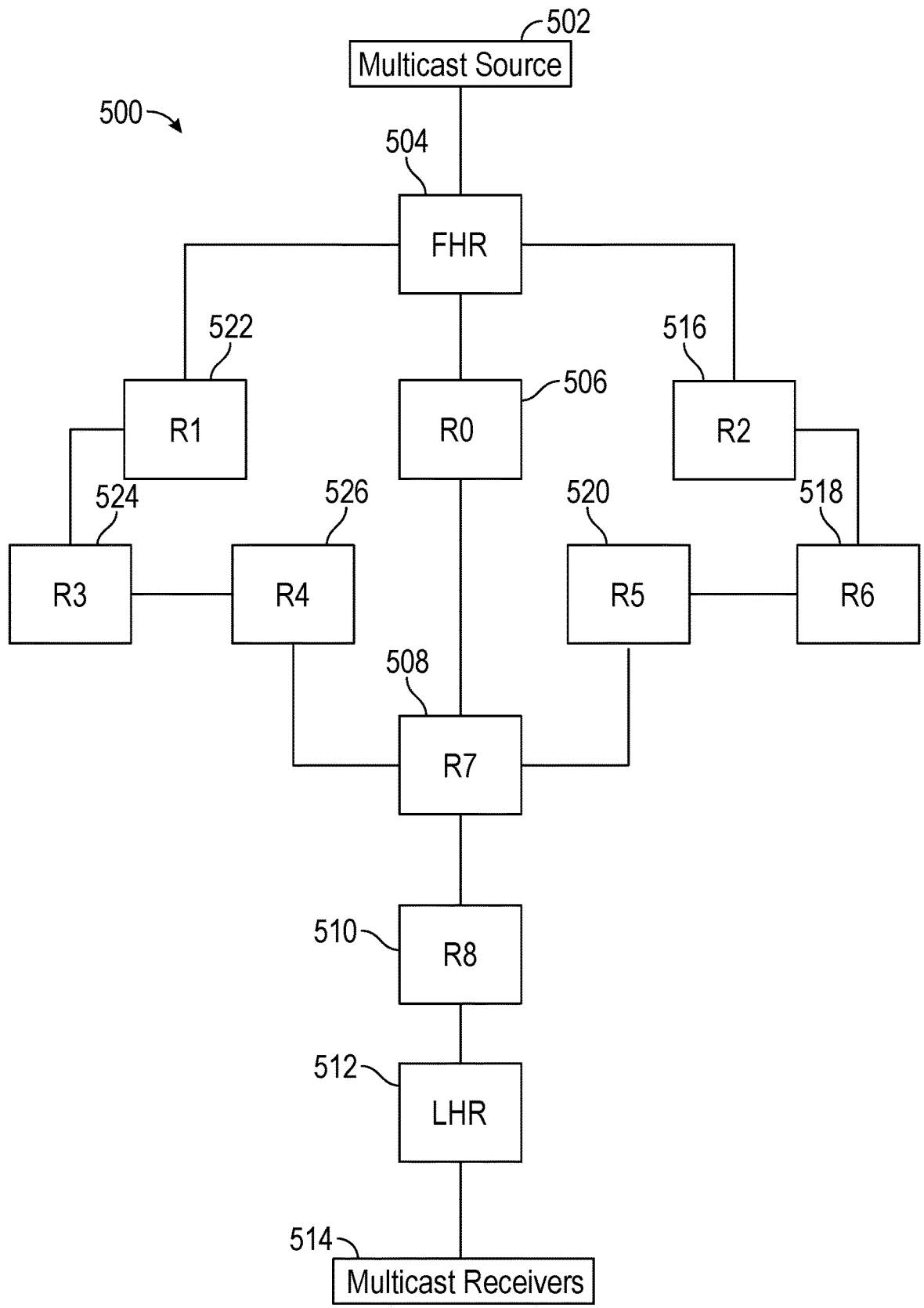
FIG. 5 illustrates a multicast tree with unequal cost multi-paths.

FIG. 5 illustrates an example multicast tree 500 with Unequal Cost Multipaths (UCMP). Multicast tree 500 may include a multicast source 502 and multicast receivers 514. Multicast source 502 may be connected to multicast receivers 514 via a plurality of routers, for example, a First Hop Router (FHR) 504, a router R0 506, a router R7 508, a router R8 510, a Last Hop Router (LHR) 512, a router R2 516, a router R6 518, a router R5 520, a router R1 522, a router R3 524, and a router R4 526. FHR 504 and LHR 512 may also be referred to as boundary routers. Router R0 506 may comprise a Device Under Test (DUT).

In example embodiments, multicast tree 500 may be rooted at multicast source 502 and may include a plurality of data paths to multicast receivers 514 through different branches. For example, a first data path may include FHR 504, router R0 506, router R7 508, router R8 510, and LHR 512. A second data path may include FHR 504, router R2 516, router R6 518, router R5 520, router R7 508, router R8 510, and LHR 512. A third data path may include FHR 504, router R1 522, router R3 524, router R4 526, router R7 508, router R8 510, and LHR 512. The first data path and the second data path are UCMP as they have a different number of nodes from each other. Similarly, the first data path and the third data path are UCMP. However, the second data path and the third data path are Equal Cost Multi Path (ECMP) with respect to each other as each has a same number of nodes.

In example embodiments, one or more of multicast receivers 514 may originate a join request to join a multicast group for receiving a multicast stream being provided by multicast source 502. The join request, in Protocol Independent Multicast Source Specific Multicast (PIM-SSM) protocol, may be an Internet Group Management Protocol (IGMP) membership report and may include a multicast group address G and a source address S. In some examples, the join request may not include a source address. If the source address is unspecified, the source address and multicast group address may be expressed as a tuple (*, G), where * is a placeholder that indicates the source address is unspecified.

Multicast receivers 514 may send the join request to LHR 512. The join request may be received by LHR 512. LHR 512, after receiving the join request may, terminate the IGMP join and initiate a PIM join towards multicast source 502. LHR 512 may determine router R8 510 to be a next node toward multicast source 502. Hence, LHR 512 may send the join request to router R8 510. Router R8 510 may receive the join request from LHR 512 and determine a next node toward multicast source 502. For example, router R8 510 may determine router R7 508 to be a next node toward multicast source 502 and may send the join request to router R7 508. Router R7 508 may receive the join request from router R8 510 and determine a next node toward multicast source 502.

Continuing with FIG. 5, there may be three upstream nodes from router R7 508, for example, router R0 506, router R5 520, and router R4 526. In example embodiments, router R7 508 may be operative to choose the next node based on a shortest path to multicast source 502. For example, router R7 508 may determine router R0 506 as the next node and may send the join request to router R0 506. Router R0 506 may receive the join request and determine that router R0 506 may be unable to accommodate the join request. For example, router R0 506 may not have multicast routing enabled, or router R0 506 may have been isolated by an administrator from participating in the multicast group.

Upon determining that router R0 506 may be unable to accommodate the join request, router R0 506 may send a redirect message to router R7 508. In example embodiments, router R7 508, upon receiving the redirect message from router R0 506, may determine an alternate next node even when the alternate next node may not provide an ECMP path. For example, router R7 508 may send the join request to one of router R4 526 or router R5 520. Router R4 526 or router R5 520, upon receiving the join request from router R7 may either send the join request to a next upstream node towards multicast source or send a redirect message to router R7 508 when they are unable to accommodate the join request.

In response to receiving the redirect message from each of the alternate upstream nodes, router R7 508 may send a redirect message to router R8 510. Router R8 510, upon receiving the redirect message from router R7 508, may attempt to determine an alternate upstream node towards multicast source 502. Since there are no alternate upstream nodes from router R8 510, router R8 510 may send the redirect message to LHR 512. Similarly, LHR 512, upon receiving the redirect message from router R8 510, may attempt to determine an alternate upstream node towards multicast source 502. Since there are no alternate upstream nodes from LHR 512, LHR 512 may send a failure to join message to multicast receivers 514.

In example embodiments, LHR 512 may be operative to analyze the redirect message to detect error and an originating point for the error. For example, when a router sends a join request to a next hop toward a source, the router may not keep track of whether the join request was successful. However, every router may keep track of active joins to any neighbor and send it as part of a Hello option in a periodic Hello. If there is a mismatch in count, failure may be detected. Upon detecting the failure, a warning message may be provided to an administrator to check for an error. In addition to providing a warning message to the administrator, an auto recovery process may be activated. For the auto recovery, in case of the mismatch in the count, an upstream router may send a list of join requests received from the downstream router. For example, router R0 506 may be configured to block all the multicast join requests at the port itself. In such a scenario, all join requests may be dropped at an ingress port itself by router R0 506. In such a scenario, the join request may not be processes to send a redirect message.

However, router R0 506 may send a Hello with a total number of active join requests as "0" whereas router R7 508 may send a Hello with a total number of active join requests as "X". Since there may be a mismatch in the number of active join requests in the exchanged Hellos, router R7 508 may try to determine an alternate path for the join request. However, if router R0 506 is configured to drop only a subset of join requests, there may be a mismatch in a total number of active join requests between router R7 508 and router R0 506. Router R0 506 then may send a list of join requests to router R7 508. Router R7 508 then may determine an alternate path for the join requests not present in the list.

In example embodiments, if a complete router is going down, the router may send a redirect message with error code "router going out of service." For example, when multicast services may need to be removed from router R0 506, router R0 506 may send a redirect message with error code "Router going out of service". Once the redirect message is received at router R7 508, router R7 508 may start looking for an alternate path for all join requests for which router R0 506 was a next upstream node. If router R7 508 may not find any alternate path, router R7 508 may send a redirect message to router R8 510 that may send another redirect message to LHR 512. In example embodiments, an error code from router R0 506 may not be overwritten so that an administrator may be able to take adequate steps to recover.

In example embodiments, upstream routers may keep track of active join requests at any given point of time and report a number of active join requests with a Hello. A downstream router may also report a number of active join requests for which a next hop is the upstream router. In case of a mismatch in numbers of join request, a warning may be provided to an administrator. The upstream router may send a list of active join requests received from the downstream router and the downstream router may determine a difference and take an action based on the determined difference. In example embodiments, the list may only include an active join requests count and may ignore prune states. If the upstream router is connected to multiple routers on a local area network where each of the downstream routers may be sending a join request upstream, the list of active join requests may be reported per downstream router. Respective downstream routers then may compare the list with a number of join requests initiated by the downstream routers to the upstream router.

Figure 6:
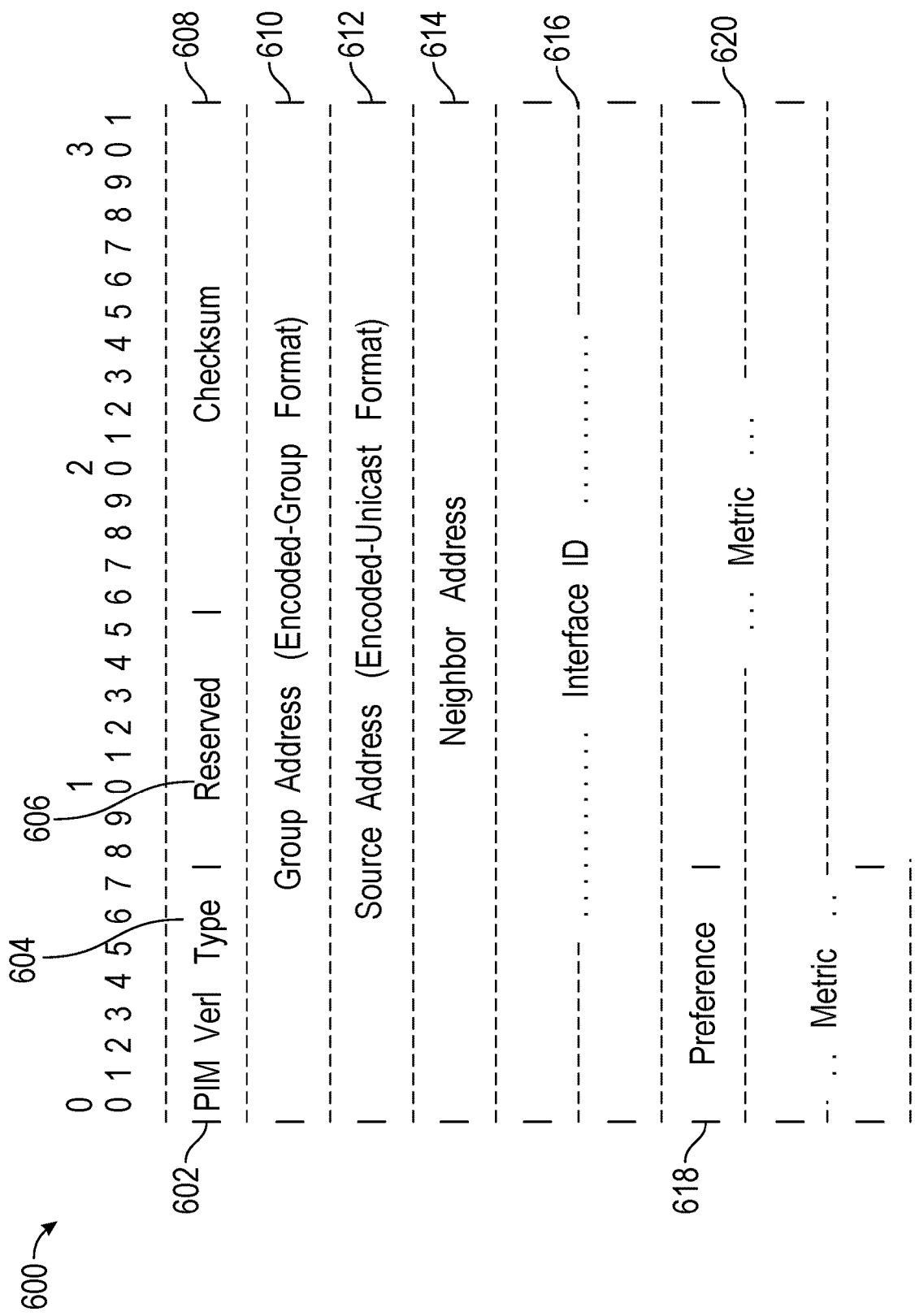
FIG. 6 illustrates an example of a redirect message packet.

FIG. 6 illustrates an example redirect message packet 600. Redirect message packet 600 may be a modified ECMP redirect massage packet. Hence, in accordance with example embodiments, example redirect message 600 may be used as both an ECPM redirect as well as a device redirect based on a neighbor address field and an interface ID field usage. For example, each of the neighbor address field and the interface ID field may carry valid bits when used for ECMP redirect. However, for a device redirect both the neighbor address field and the interface ID field may be set to 0. Hence, when a node receives a device redirect message from all possible upstream nodes, the device redirect message may be propagated down to a previous downstream device thus informing the downstream device to attempt to determine an alternate data path.

As shown in FIG. 6, redirect message packet 600 may comprise a plurality of fields, for example, a PIM Ver field 602, a type field 604, a reserved field 606, a checksum field 608, a group address field 610, a source address field 612, a neighbor address field 614, an interface ID field 616, a preference field 618, and a metric field 620. A format and length of the values in each of the plurality of fields may be predefined. For example, values for PIM Ver field 602, reserved field 606, and checksum field 608 may be defined by a standard. Group address field 610 may be between 64 and 160 bits and source address field 612 may be between 48 and 144 bits. Preference field 618 may be 8 bits and metric field 620 may be 64 bits.

Neighbor address field 614 may be between 32 and 128 bits, and may comprise an address of a desired upstream neighbor where the downstream receiver may redirect a PIM join. In example embodiments, for ECMP redirect, neighbor address field 614 may include a valid neighbor address for the link on which the upstream node may want the downstream node to send PIM join. For device redirect, neighbor address field 614 may be set to 0.0.0.0. Interface ID field 616 may be between 34 bits. In example embodiments, for ECMP redirect, interface ID field 616 may include a valid interface ID on the upstream node. For device redirect, interface ID field 616 may be set to 0.0.0.0.

Figure 7:
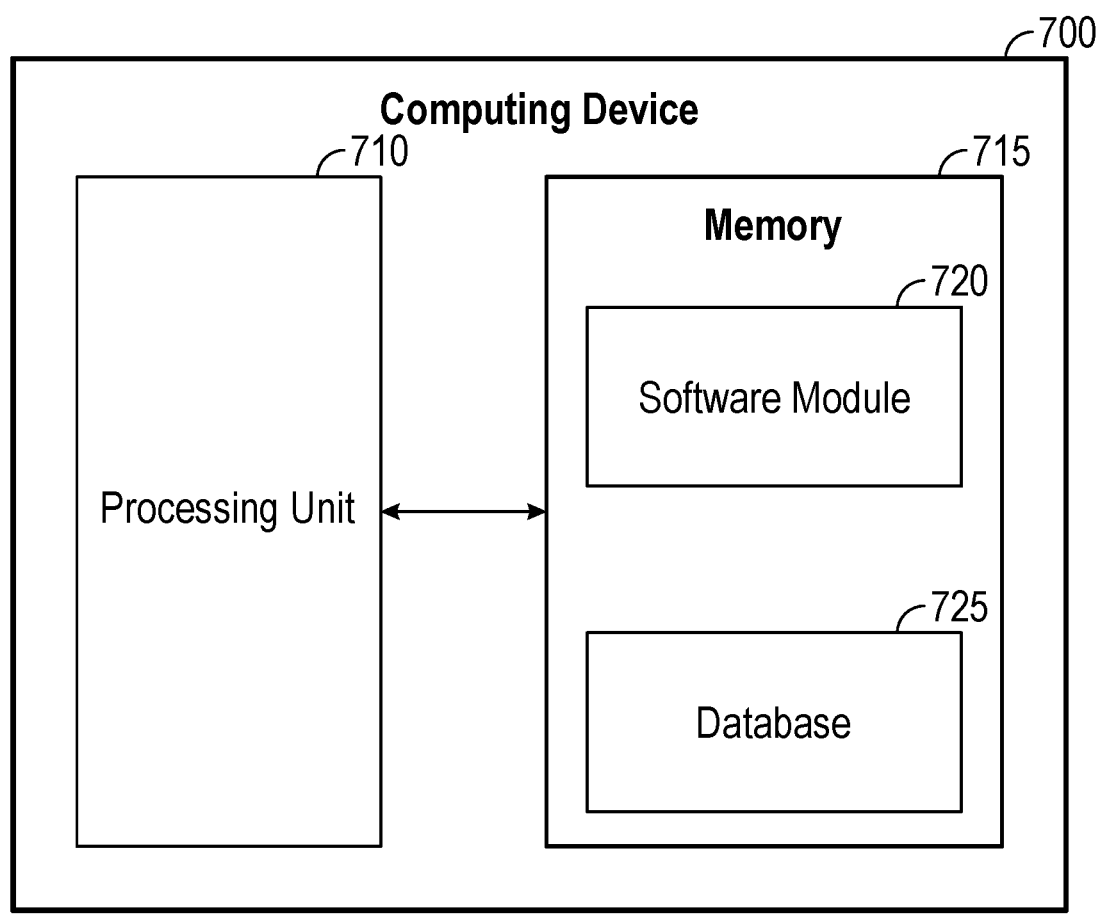
FIG. 7 is a block diagram of a computing device.

FIG. 7 shows computing device 700. As shown in FIG. 7, computing device 700 may include a processing unit 710 and a memory unit 715. Memory unit 715 may include a software module 720 and a database 725. While executing on processing unit 710, software module 720 may perform processes for providing multicast error detection and recovery, including for example, any one or more of the stages from method 400 described above with respect to FIG. 4. Computing device 700, for example, may provide an operating environment for plurality of servers 105, plurality of leaf switches 110, and plurality of spine routers 115. Plurality of servers 105, plurality of leaf switches 110, and plurality of spine routers 115 may operate in other environments and are not limited to computing device 700.

Computing device 700 may be implemented using a personal computer, a network computer, a mainframe, a router, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

According to example embodiments, a method may comprise: sending, from a first network node, a join request for a multicast stream to a second network node, the join request being sent over a first link of a plurality of links between the first network node and the second network node; receiving, by the first network node from the second network node, a redirect message indicating that the second network node cannot accommodate the join request; in response to receiving the redirect message, not sending, by the first network node to the second network node, the join request for the multicast stream on a second link of the plurality of links; and in response to receiving the redirect message, determining, by the first network node, an alternate upstream network node to send the join request for the multicast stream to.

In example embodiments, receiving the redirect message indicating that the second network node cannot accommodate the join request may comprise: sending, by the second network node, the join request to a third network node, the third network node being the alternate upstream network node from the second network node; receiving the redirect message from the third network node; and receiving, from the second network node in response to the second network node receiving the redirect message from the third network node, the redirect message indicating that the second network node cannot accommodate the join request.

According to embodiments, receiving the redirect message indicating that the second network node cannot accommodate the join request may comprise receiving the redirect message indicating that the second network node cannot accommodate the join request in response to the second network node being isolated from the multicast stream. In addition, receiving the redirect message indicating that the second network node cannot accommodate the join request may comprise receiving the redirect message indicating that the second network node cannot accommodate the join request in response to the first network node being associated with bandwidth use restrictions. Determining the alternate upstream network node may comprise determining the alternate upstream node using Equal Cost Multipath (ECMP) routing process. In addition, determining the alternate upstream network node may comprise determining the alternate upstream node using Unequal Cost Multipath (UCMP) routing process.

In example embodiments, the method may further comprise sending the join request to the alternate upstream network node. Moreover, the method may further comprise receiving, from the alternate upstream network node, another redirect message indicating that the alternate upstream network node cannot accommodate the join request. In addition, the method may further comprise sending, by the first network node, the another redirect message to a downstream node. Sending the join request may comprise sending a Protocol Independent Multicast (PIM) request.

According to example embodiments, an apparatus may comprise: a memory storage; and a processing unit coupled to the memory storage, wherein the processing unit is operative to: receive a join request for a multicast stream from a first network node; determine a next hop for the join request, the next hope comprising a second network node; send the join request to the second network node, the join request being sent over a first link of a plurality of links connecting the second network node; receive, from the second network node, a redirect message indicating that the second network node cannot accommodate the join request;

and in response to receiving the redirect message and in response to sending only one join request for the multicast stream to the second network node, determining an alternate upstream network node to send the join request for the multicast stream to.

According to example embodiments, a non-transitory computer readable medium that may store a set of instructions which when executed perform a method executed by the set of instructions may comprise: receiving, at a first network node, a join request for a multicast stream; sending, from the first network node, the join request to a second network node, the join request being sent over a first link of a plurality of links between the first network node and the second network node; receiving, by the first network node from the second network node, a redirect message indicating that the second network node cannot accommodate the join request; in response to receiving the redirect message, not sending, by the first network node to the second network node, the join request for the multicast stream on a second link of the plurality of links; and in response to receiving the redirect message, determining, by the first network node, an alternate upstream network node to send the join request for the multicast stream to.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:
1. A method comprising:
   sending, from a first network node, a join request for a multicast stream to a second network node, the join request being sent over a first link of a plurality of links between the first network node and the second network node;
   receiving, by the first network node from the second network node, a redirect message indicating that the second network node cannot accommodate the join request wherein receiving the redirect message indicat- ing that the second network node cannot accommodate the join request comprises:
  sending, by the second network node, the join request to a third network node, the third network node being an upstream network node from the second network node,
  receiving the redirect message from the third network node, and
  receiving, from the second network node in response to the second network node receiving the redirect message from the third network node, the redirect message indicating that the third network node cannot accommodate the join request;
in response to receiving the redirect message, not sending, by the first network node to the second network node, the join request for the multicast stream on a second link of the plurality of links; and
in response to receiving the redirect message, determining, by the first network node, an alternate upstream network node to send the join request for the multicast stream to.

2. The method of claim 1, wherein receiving the redirect message indicating that the second network node cannot accommodate the join request comprises receiving the redirect message indicating that the second network node cannot accommodate the join request in response to the second network node being isolated from the multicast stream.

3. The method of claim 1, wherein receiving the redirect message indicating that the second network node cannot accommodate the join request comprises receiving the redirect message indicating that the second network node cannot accommodate the join request in response to the first network node being associated with bandwidth use restrictions.

4. The method of claim 1, wherein determining the alternate upstream network node comprises determining the alternate upstream node using Equal Cost Multipath (ECMP) routing process.

5. The method of claim 1, wherein determining the alternate upstream network node comprises determining the alternate upstream node using Unequal Cost Multipath (UCMP) routing process.

6. The method of claim 1, further comprising sending the join request to the alternate upstream network node.

7. The method of claim 6, further comprising receiving, from the alternate upstream network node, another redirect message indicating that the alternate upstream network node cannot accommodate the join request.

8. The method of claim 7, further comprising sending, by the first network node, the another redirect message to a downstream node.

9. The method of claim 1, wherein sending the join request comprises sending a Protocol Independent Multicast (PIM) request.

10. An apparatus comprising:
  a memory storage; and
  a processing unit coupled to the memory storage, wherein the processing unit is operative to:
    receive a join request for a multicast stream from a first network node;
    determine a next hop for the join request, the next hop comprising a second network node;
    send the join request to the second network node, the join request being sent over a first link of a plurality of links connecting the second network node;
    receive, from the second network node, a redirect message indicating that the second network node cannot accommodate the join request;
    in response to receiving the redirect message and in response to sending only one join request for the multicast stream to the second network node, determine an alternate upstream network node to send the join request for the multicast stream to;
    receive a list of active join requests from the second network node;
    compare a number of active join request on the list with a number of join requests sent to the second network node; and
    determine an error when the number of active join request on the list is different than the number of join requests sent.

11. The apparatus of claim 10, wherein the processing unit is further operative to send, in response to determining the error, a warning message to an administrator.

12. The apparatus of claim 10, wherein the processing unit is further operative to send the join request to the alternate upstream network node.

13. The apparatus of claim 10, wherein the list is received in a Hello message received from the second network node.

14. A non-transitory computer readable medium that stores a set of instructions which when executed perform a method executed by the set of instructions comprising:
  receiving a join request for a multicast stream from a first network node;
  determining a next hop for the join request, the next hop comprising a second network node;
  sending the join request to the second network node, the join request being sent over a first link of a plurality of links connecting the second network node;
  receiving, from the second network node, a redirect message indicating that the second network node cannot accommodate the join request;
  in response to receiving the redirect message and in response to sending only one join request for the multicast stream to the second network node, determining an alternate upstream network node to send the join request for the multicast stream to;
  receiving a list of active join requests from the second network node;
  comparing a number of active join request on the list with a number of join requests sent to the second network node; and
  determining an error when the number of active join request on the list is different than the number of join requests sent.

15. The non-transitory computer readable medium of claim 14, further comprising, in response to determining the error, sending a warning message to an administrator.

16. The non-transitory computer readable medium of claim 14, further comprising sending the join request to the alternate upstream network node.

17. The non-transitory computer readable medium of claim 15, wherein the list is received in a Hello message received from the second network node.

* * * * *